United States Patent Office 3,281,799
Patented Oct. 25, 1966

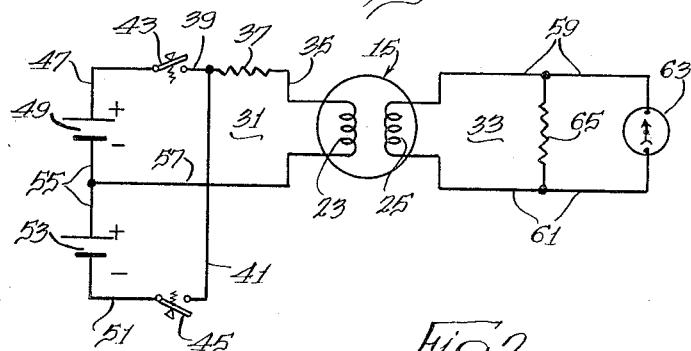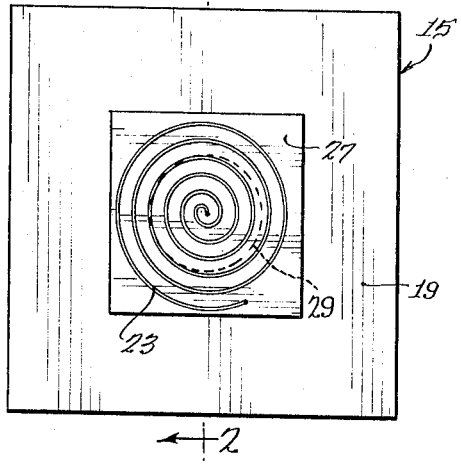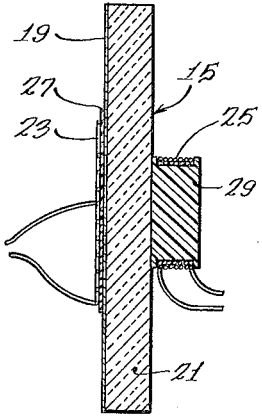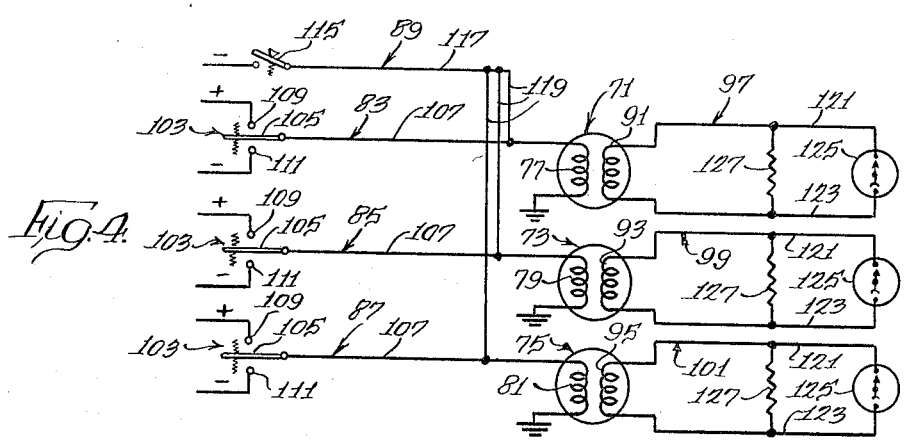

3,281,799
SUPERCONDUCTIVE INFORMATION STORAGE DEVICE
Victor A. J. van Lint, San Diego, and Park H. Miller, Jr., Del Mar, Calif., assignors to General Dynamics Corporation, New York, N.Y., a corporation of Delaware
Filed Oct. 2, 1957, Ser. No. 687,806
8 Claims. (Cl. 340—173.1)

The present invention relates generally to electrical memory devices and more particularly to information storing devices suitable for use in various electrical and electronic circuits.

In computers and other high speed switching systems it is necessary to store, at least temporarily, bits of information in the form of electrical pulses. In particular, there is a need for control purposes for a device which can be switched to one of two stable states and which will then remain in that state until the device is switched to the other state. This property of remaining in a stable state even after the means which fixes the state is deenergized is termed a memory. Although various forms of bistable memory devices have been previously developed, such devices have not been completely satisfactory.

A general object of the invention is to provide an improved storage or memory device; to provide a bi-stable device exhibiting a memory; to provide a simple yet reliable memory device suitable for use in storage and counting circuits of various types; to provide such a memory device which has a pulse time resolution of less than one micro-second; to provide such a device wherein information may be stored for long periods of time without regeneration and where the storage and reading out of information may be at random time intervals; to provide such a device which is compact in size, of simple mechanical structure and which may be used for indefinite periods of time.

It is well known that at low temperatures certain metals, alloys and compounds go through a superconducting transition into a state in which the electrical resistance has a value approaching zero, thereby becoming a perfect or nearly perfect electrical conductor. The change from the normal to the superconducting state is reversible and takes place at a temperature which depends upon the magnetic field as well as on the material. We have now discovered that a thin superconducting film having a magnetic field producing means such as a length of wire conductor or an exciting coil on one side and a signal pickup means such as a coil on the other side, when constructed as hereinafter set forth, may be utilized as a bi-stable storage or memory device. The adaptability of such a structure as a memory device may be demonstrated by applying positive and negative current pulses to the excitation means and observing the current pulses induced in the pickup means. For example, in a device having an exciting coil and a pickup coil, if very small current pulses are applied to an exciting coil, no current pulses or signals are induced in the pickup. This phenomenon is expected, since a superconducting film is generally an effective electromagnic shield. As the exciting current is increased, current pulses begin to be induced in the pickup coil. These pulses are apparently due to increments of magnetic flux which penetrate the film and induce currents in the pickup coil. If a single pulse is applied to the exciting coil and then turned off, only a single pulse of like polarity is observed in the pickup coil, the pulse being induced by the expanding flux produced by the pulse rise. The flux which was forced through the film apparently does not collapse when the pulse decays but remains as residual magnetization. If a series of input pulses of one polarity are applied to the exciting coil, it will be observed that only the first pulse produces a signal on the pickup coil. If the polarity of the input pulses is reversed, only the first pulse of opposite polarity produces a signal in the pickup coil. This may be explained by a reversal in the direction of the residual magnetization in the superconducting film. If sufficiently large exciting currents are used, only part of the flux remains as residual magnetization in the film. The first exciting pulse of a given polarity will in this case produce a large pulse of like polarity associated with the flux change caused by the pulse rise, followed by a smaller signal of opposite polarity due to the collapsing of part of the flux when the pulse decays. Subsequent pulses of like polarity will then produce like and opposite polarity signals of the same magnitude as the initial smaller return signal.

A device of this type may be used as a bi-stable memory device since the film remembers the polarity of a previously existing current pulse by retaining a residual magnetization of that polarity. The information can be read out by applying another pulse to the exciting coil and observing whether a signal appears in the pickup coil.

Accordingly, a further object of the present invention is the provision of a memory device which will respond to an electrical signal of known polarity by indicating whether the signal is of the same or opposite polarity of a previously applied signal.

Other objects and advantages of the present invention will become obvious by reference to the following description and the accompanying drawings of various embodiments of the invention.

In the drawings:

FIGURE 1 is an enlarged front elevation view of the film and coil arrangement of a memory device formed in accordance with the present invention;

FIGURE 2 is a cross sectional view taken along line 2—2 of FIGURE 1;

FIGURE 3 is a schematic diagram illustrating a simple circuit utilizing a memory device formed in accordance with this invention; and FIGURE 4 is a schematic diagram showing a simple adding device utilizing a series of memory devices formed in accordance with this invention.

Referring to FIGURES 1 and 2 of the drawings, there is shown a memory device 15 which includes a thin superconducting film 19 adhering on a supporting plate of insulating material 21, a flat, spirally wound exciting coil 23 located closely adjacent one side of the superconducting film 19 and an axially wound, cylindrical pickup coil 25 located adjacent the other side of the plate 21 in general alignment with the exciting coil 23.

Although various substances become superconducting at or below a critical transition temperature and may therefore be employed in forming the film 19, in the disclosed embodiment of the invention the film 19 is formed of lead. A uniform film 19 may be suitably deposited on the plate 21 by any suitable means, such as by a vacuum evaporation process. For most satisfactory operation of the memory device 15, the thickness of the superconducting film 19 should be less than 3000 angstrom units and should preferably be between 50 and 200 angstrom units.

The supporting plate or backing 21 upon which the superconducting lead film is deposited is provided for structural purposes, and should be electrically non-conducting and be able to withstand sudden and/or severe changes in temperature. The plate 21 may be of Pyrex glass, or of any other material having the above described properties. The plate 21 should be no thicker than the diameter of the exciting coil 23 and is preferably of a thickness less than about one-fourth of the diameter of the exciting coil 23.

The exciting coil 23 is of flat spiral form of a suitable number of turns to produce a magnetic field sufficient to penetrate the superconducting film. An excitation coil which produces a flux density of one gauss or less in free space is generally sufficient to penetrate the superconducting film of the present device. This is considerably smaller than the value of the field required to completely destroy the superconductivity of the film.

The exciting coil 23 should be insulated from and yet be positioned as close as possible to the superconducting film 19. In general the exciting coil should be at a distance less than .010 of an inch from the film. In the disclosed embodiment the coil 23 is adhesively secured by a suitable low temperature cement to a thin strip of insulating material 27 having good dielectric properties at very low temperatures such as a polyethylene terephthalate resin commonly known under the trade name "Mylar." The insulating strip 27 in turn is adhesively secured to the superconducting film 19 by a suitable low temperature cement.

The cylindrical pickup coil 25 is located in general alignment with the exciting coil 23, but on the opposite side of the supporting plate 21. The pickup coil 25 comprises any suitable number of turns of relatively fine insulated wire wound on a suitable bobbin 29 so as to provide an adequate signal when the magnetic flux from the exciting coil 23 penetrates the film 19. The coil 25 may be fixed in position by adhesively securing one end of the bobbin with any suitable low temperature cement to the supporting plate 21. The outer diameter of the pickup coil 25 should be less than the outer diameter of the exciting coil, and preferably within the range of from two-thirds to one-tenth of the diameter of the exciting coil 23.

For the purposes of the present invention the entire memory device 15 is maintained at a temperature below the critical transition temperature of the material used for the superconducting film. If a lead film is used the memory device may be immersed in liquid helium which has a temperature of about 4.2 degrees, approximately 3 degrees below the critical transition temperature of lead.

In one specific construction of the illustrated memory device a uniform lead film of about 150 angstrom units in thickness was evaporated on one side of a $\frac{1}{16}$ inch Pyrex plate. The exciting coil was formed of 6 turns of No. 40 Formvar insulated copper wire wound into a flat coil having a diameter of ¼ inch. The exciting coil was cemented to the center of a .0005 inch sheet of Mylar which in turn was centered on and cemented to the lead film. The pickup coil was formed of 100 turns of No. 40 Formvar insulated copper wire wound on a cylindrical Lucite bobbin of about $\frac{2}{10}$ inch in diameter. One end of the bobbin was suitably cemented to the center of the Pyrex plate opposite the lead film so that the axis of the pickup coil was in alignment with the axis of the exciting coil. This unit was placed in liquid helium and performed with complete satisfaction as a memory device. It had a pulse time resolution of less than one microsecond, retained stored information in the form of magnetic flux for long periods without any sign of diminution and was entirely stable in operation.

It should be understood that various modifications may be made in the disclosed memory device without destroying the operability of the device. For example, the exciting means may consist of only a single length of wire extending parallel to and adjacent the superconducting film; the exciting coil might be cemented directly on the superconducting film, etc.

Having described the memory device 15, reference is now made to FIGURE 3 wherein a simple circuit utilizing the device is schematically illustrated. The exciting coil 23 of the memory device is connected in an input signal and interrogation circuit 31, and the pickup coil 25 of the memory device is connected in a read-out circuit 33.

The input or interrogation circuit 31 is designed to permit a current pulse of either polarity, as desired, to be applied to the exciting coil 23.

The circuit 31 comprises the exciting coil 23 one end of which is connected to the positive terminal of a voltage source 49 through a resistance 37, a normally open switch 43 and leads 35, 39 and 47, and to the negative terminal of a second voltage source 53 through the resistance 37, normally open switch 45 and leads 35, 41 and 51. The other terminals of the voltage sources 49 and 53 are joined to the other end of the exciting coil 23 by leads 55 and 57. The resistance 37 is of a suitable number of ohms adapted to restrict the flow of current to the exciting coil to about a value of 0.1 ampere. Thus it will be seen that by closing the switch 43 a current impulse will be applied to the exciting coil 23. By closing the other switch 45 a current impulse of opposite sign will be applied to the exciting coil 23.

The read-back circuit 33 is designed to indicate the presence of an induced current in the pickup coil 25. The read-back circuit comprises the pick-up coil 25 which is connected by leads 59 and 61 to an indicating device 63 such as a ballistic galvanometer or oscilloscope. The indicating device 63 is shunted by a suitable resistance 65 of approximately 100 ohms to prevent oscillation of the induced current pulse. The elements forming circuits 31 and 33 are so selected as to provide a current of about 0.1 ampere in the input circuit and an induced pulse of about 0.2 millivolt across the pickup coil. The time constant of the readout circuit will then be about 1 microsecond.

The circuit shown in FIGURE 3 may be operated by closing one of the switches 43 or 45 to provide a current pulse of known signal to the exciting coil 23 which sets up a magnetic field, at least a portion of which remains in the superconducting film as residual magnetization, and causes a large pulse of like polarity in the pickup coil which may be observed by the indicating means of the readout circuit. Any subsequently applied current pulses of the same polarity will not affect the direction of the residual magnetic field and will not produce any large induced current pulses in the pickup coil. However, should there be a subsequent applied current pulse of the opposite polarity, the direction of the residual magnetic field in the superconducting film will be reversed, resulting in a large induced current pulse of similar polarity in the pickup coil and, therefore, an observable reading on the indicating means in the readout circuit.

At any time it is possible to determine the polarity of the last pulse which has been applied to the exciting coil of the memory unit. This may be accomplished by applying a current pulse of given polarity to the exciting coil. If a large pulse is observed in the indicating means, the last pulse was of opposite polarity. On the other hand, if either no pulse or a pair of small pulses of equal height but opposite polarity are observed, then the last pulse on the exciting coil was of like polarity.

While many and various applications may be found for a memory device formed in accordance with this invention, perhaps its greatest application may lie in the field of high speed computers. To illustrate the manner in which it might be used in a computing device, a simple arrangement of a series of memory units and associated circuitry adapted for use as an adding device will be described.

The adding device illustrated in FIGURE 4 includes three memory devices 71, 73 and 75. Additional memory devices may be added as desired to increase the numerical capacity of the arrangement. The exciting coils 77, 79 and 81 of the memory devices are connected in input signal circuit sections 83, 85 and 87 respectively and in a common interrogation circuit section 89. The pickup coils 91, 93 and 95 are each connected in readout circuit sections 97, 99 and 101 respectively.

The input signal circuit sections 83, 85 and 87 of the adding device are similar and each includes a normally open single pole double throw switch 103 having a central movable contact 105 which connects through a lead 107 to one side of the pickup coil of its associated memory device, and fixed contacts 109 and 111 which connect with suitable input voltages of opposite polarity respectively. As seen in FIGURE 4, each of the contacts 109 connects with a positive input voltage source and each of the contacts 111 connects with a negative input voltage source. The end of each of the pickup coils opposite the lead 107 connects to ground to complete the circuit through the pickup coil when the associated switch 105 is in closed position.

The interrogation circuit section 89 of the device includes a normally open single pole, single throw switch 115, one contact of which connects with a suitable input voltage of either polarity and the other contact of which connects with each of the leads 107 through suitable leads 117 and 119. In the illustrated structure a negative voltage source connects with the switch 115.

The readout circuit sections 97, 99 and 101 are also similar and each includes one of the pickup coils which is connected by leads 121 and 123 to a suitable indicating device 125. The indicating device is shunted by a suitable resistor 127 to prevent oscillation.

Operation as an adding machine or device may best be illustrated by a number of examples. Suppose one desires to add 1 and 1. The first operation is to clear the device by momentarily closing the interrogation switch 115 thereby sending negative current pulses through each of the exciting coils 77, 79 and 81 of the memory devices. This causes a negatively directed magnetic field to remain in each of the memory devices. The number 1 may be entered into the adding device by temporarily closing the switch 103 associated with the first memory device 71 so that a positive current pulse is caused to flow through the exciting coil 77. The residual magnetic field of the superconducting film of the memory device 71 will be reversed in direction and a positive readout pulse signal will be observed in the indicating device of the readout circuit 97. The adding device now remembers the number 1. If the interrogation switch 115 was closed at this time to read out the sum in the adding device, the second and third memory devices 73 and 75 would not be disturbed but the direction of the residual magnetic field in the first memory unit 71 would be reversed, thereby causing a signal to be displayed by the indicating device 125 of the first readout circuit 97 indicating the sum of 1.

To add 1 and 1, after entering the number 1 into the adding device in the manner described above, one again closes the switch 103 which is associated with the first memory device 71, to provide a positive pulse through the exciting coil 77. As the residual magnetic field is already oriented in the positive direction, no signal will be displayed by the indicating device of the readout circuit 97. Noting that no signal has been produced, the next operation is to close the switch 103 associated with the first memory unit 71 to provide a negative current pulse to the exciting coil of the memory device 77 and to close the switch 103 associated with the next or second memory unit 73 to provide a positive current pulse through its exciting coil 79. The closing of these two switches in the manner described should be considered one operation. This operation has the effect of reversing the direction of the frozen magnetic field in the first memory unit 71 to its original or negative direction and of reversing the direction of the residual magnetic field in the second memory unit 73. The sum can now be read back from the device by closing the interrogation switch 115. As the residual magnetic fields in the first and third memory units 71 and 75 are oriented in the negative direction, the indicating devices 125 in their associated readout circuits 97 and 101 will not display a signal. However, a signal will be displayed by the indicating device 125 of the second readout circuit 99 indicating the sum of 2.

Suppose now it is desired to add 1 and 2. This may be accomplished by closing the switches 103 of the first and second memory devices 71 and 73 respectively so that positive pulses are applied to the pickup coils 91 and 93. This operation has the effect of reversing the residual magnetic fields of each of the memory units 71 and 73 and may be thought of as placing the numbers 1 and 2 in the adding device. The sum can now be read out by closing the interrogation switch 115. The residual magnetic fields of the first and second memory devices will again be reversed and an accompanying signal will be displayed by the respective indicating devices 125 of their readout circuits 97 and 99. The combined simultaneous signals displayed by the indicating devices of the first and second read-back circuits 83 and 85 indicate the sum of 3.

Suppose once again, it is desired to add 2 and 3. The number 2 may first be placed in the adding device by closing the switch 103 associated with the second memory device 73 to apply a positive current pulse to the pickup coil 93. The indicating device of the second readout circuit 99 will display a signal indicating the number 2 has been received. The number 3 may now be placed in the adding device by closing the switches 103 of the first and second memory devices 71 and 73 to apply a positive pulse to pickup coils 91 and 93. This causes a reversal of the residual field in the first memory unit 71 which is indicated by a signal observed in the indicating device 125 of the first readout circuit 97. However, as the residual magnetic field in the second memory device 75 is oriented in the positive direction, no signal is observed in the indicating device 125 of the second readout circuit 99. As before, in the first example, noting the lack of a responsive signal from the second memory device 73, the next operation is the closing of the switch 103 of the second memory device 73 to apply a negative current pulse on the pickup coil 93 and the closing of the switch 103 of the next or third memory device 75 to apply a positive current pulse to the pickup coil 95. This reverses the residual field of the second memory device 73 to the negative direction and the residual field of the third memory device 75 to the positive direction. The sum may now be determined by again closing the interrogation switch 115. As only the residual field in the first and third memory units 71 and 75 will now be reversed, a responsive signal will be observed in each of the indicating devices 125 of the first and third readout circuits 97 and 101. The combined simultaneous responsive signal of the indicating devices of the first and third readout circuits 97 and 101 indicates the sum of 5.

It is apparent from the foregoing that a readout signal observed only in the indicating device 125 of the third readout circuit 101 indicates the number 4 and a combined readout signal from the indicating devices 125 of all three readout circuits 97, 99 and 101 indicates the figure 7.

It is clearly apparent that, with a sufficient number of memory units, an adding device capable of handling very large numbers may be employed, and in view of the fact that the resolution of the memory devices is less than 1 micro-second, it will readily be observed that, even for very large numbers, the summation response is quite rapid.

It will be appreciated by one skilled in the art that a memory device according to this invention may be employed in many different types of circuits than those described. In addition, it will be appreciated that various changes and modifications may be made in the disclosed memory device without departing from the scope of the invention which is to be determined from the appended claims.

We claim:

1. An information storage device comprising a thin film of superconducting material having a thickness less than 3,000 angstrom units, excitation means adjacent one side of said film, means for coupling said excitation means to a source of current pulses, said excitation means being operable in response to the flow of current pulses therethrough to form a magnetic field with components of lines of flux extending normal to the plane of said film and of a strength less than that necessary to destroy the superconductivity of the film but greater than that necessary to cause lines of flux to penetrate through said film, and pickup means fixedly disposed adjacent the other side of said film for detecting changes in the lines of flux which penetrate through said superconducting film, said film extending beyond said pickup means a sufficient distance to shield said pickup means from lines of flux other than those penetrating through said film.

2. An information storage device comprising a superconducting film of thickness less than 3000 angstrom units, a flat spiral exciting coil adjacent one side of said film, said coil being approximately parallel to and no more than .010 of an inch from said film, said exciting coil being such that a current pulse of about 0.1 ampere therethrough will produce, in free space, a magnetic field of no more than 1 gauss, means for coupling said coil to a source of current pulses, the current pulses provided by said source being less than about 0.1 ampere but greater than that necessary to cause lines of flux to penetrate through said superconducting film, and a cylindrically wound pickup coil of diameter less than that of the exciting coil fixedly located on the other side of said film, the center of said exciting coil being in approximate alignment with the axis of said pickup coil, said pickup coil being formed to detect changes in the lines of flux which penetrate through the superconducting film, said film extending beyond said pickup means a sufficient distance to shield said pickup means from lines of flux other than those penetrating through said film.

3. An information storage device comprising a lead film of thickness between about 50 and 200 angstrom units, a flat spiral exciting coil adjacent one side of said film, said coil being approximately parallel to and no more than .010 of an inch from said film, means for coupling said coil to a source of current pulses, said exciting coil being such that current pulses of about 0.1 ampere therethrough will produce, in free space, a magnetic field of not more than 1 gauss, the current pulses provided by the source being less than about 0.1 ampere but greater than that necessary to cause lines of flux to penetrate through said film, means for maintaining the lead film in an ambient temperature below its critical transition temperature, and a cylindrically wound pickup coil fixedly located on the other side of said film, the center of said exciting coil being in approximate alignment with the axis of said pickup coil, said pickup coil being formed to detect changes in the lines of flux which penetrate through said lead film, said film extending beyond said pickup coil a sufficient distance to shield pickup coil from lines of flux other than those that penetrate through said film.

4. An information storage device comprising a nonconductive supporting plate, a thin superconducting film of thickness less than 3000 angstrom units adhering to one side of said supporting plate, excitation means on the side of said film opposite said plate, means for coupling said excitation means to a source of current pulses, said excitation means being closely adjacent said film and operable in response to the flow of current pulses therethrough to form a magnetic field with components of lines of flux extending normal to the plane of said film and of a strength less than that necessary to destroy the superconductivity of the film but greater than that necessary to cause lines of flux to penetrate through said film, and pickup means fixedly disposed, on the other side of said plate for detecting changes in the lines of flux which penetrate through said superconducting film, said film extending beyond said pickup means a sufficient distance to shield said pickup means from lines of flux other than those penetrating through said film.

5. An information storage device comprising a supporting plate of insulating material, a metallic film adhering to one side of said supporting plate, a flat spiral exciting coil on the side of said film opposite to said supporting plate, means for coupling said coil to a source of current pulses, said exciting coil being approximately parallel to and at a distance less than .010 of an inch from said film and operable in response to the flow of current pulses therethrough to form a magnetic field with components of lines of flux extending normal to the plane of said film and of a strength less than that necessary to destroy the superconductivity of the film but greater than that necessary to cause lines of flux to penetrate through said film, and a pickup coil fixedly located on the opposite side of said plate and generally in line with said exciting coil for detecting changes in the lines of flux which penetrate through said metallic film, said metallic film being of a thickness less than 3000 angstrom units and being of a material which will undergo a transformation to a superconductive state at or below a critical transition temperature, and means for maintaining said metallic film in an ambient temperature which is at or below its critical transition temperature, said film extending beyond said pickup coil a sufficient distance to shield said pickup coil from lines of flux other than those penetrating through said film.

6. An information storage device comprising a supporting plate of insulating material, a metallic film of thickness less than 3000 angstrom units adhering to one side of said supporting plate, a flat spiral exciting coil on the side of said film opposite to said supporting plate, said exciting coil being approximately parallel to and at a distance less than .010 of an inch from said film, a source of current pulses coupled to said coil, said exciting coil being such that current pulses of about 0.1 ampere therethrough will produce, in free space, a magnetic field of no more than 1 gauss, the current pulses provided by said source being less than about 0.1 ampere but greater than that necessary to cause lines of flux to penetrate through said film, a cylindrically wound pickup coil of diameter less than that of the exciting coil fixedly located on the opposite side of said plate, the center of said exciting coil being in approximate alignment with the axis of said pickup coil, said pickup coil being formed to detect changes in the lines of flux which penetrate through said metallic film, said metallic film being of a material which will undergo a transformation to a superconductive state at or below its critical transition temperature, and means for maintaining said metallic film in an ambient temperature which is at or below its critical transition temperature, said film extending beyond said pickup coil a sufficient distance to shield said pickup coil from lines of flux other than those penetrating through said film.

7. An information storage device comprising a supporting plate of insulating material, a lead film of thickness between about 50 and 200 angstrom units adhering to one side of said supporting plate, a flat spiral exciting coil on the side of said film opposite to said supporting plate, a source of current pulses coupled to said exciting coil, said exciting coil being approximately parallel to and at a distance less than .010 of an inch from said film, said exciting coil being such that current pulses of about 0.1 ampere therethrough will produce, in free space, a magnetic field of no more than 1 gauss, the current pulses provided by said source being less than about 0.1 ampere but greater than that necessary to cause lines of flux to penetrate through said film, a cylindrically wound pickup coil of diameter less than that of the exciting coil fixedly located on the opposite side of said plate, the center of said exciting coil being in approximate alignment with the axis of said pickup coil, said pickup coil being formed to detect changes in the lines of flux which penetrate through said lead film, and means for maintaining the lead film in an ambient temperature which is below its critical transition temperature, said film extending beyond said pickup coil a sufficient distance to shield said pickup coil from lines of flux other than those penetrating through said film.

8. An information storage device comprising a supporting plate of insulating material, a lead film of thickness between about 50 and 200 angstrom units adhering to one side of said supporting plate, a flat spiral exciting coil on the side of said film opposite to said supporting plate, a source of current pulses coupled to said exciting coil, said supporting plate having a thickness less than the diameter of said exciting coil, said exciting coil being approximately parallel to and at a distance less than .010 of an inch from said film, said exciting coil being such that current pulses of about 0.1 ampere therethrough will produce, in free space, a magnetic field of no more than 1 gauss, the current pulses provided by said source being less than about 0.1 ampere but greater than that necessary to cause lines of flux to penetrate through said film, a cylindrically wound pickup coil of diameter less than that of the exciting coil fixedly located on the opposite side of said plate, the center of said exciting coil being in approximate alignment with the axis of said pickup coil, said pickup coil being formed to detect changes in lines of flux which penetrate through said lead film, and means for maintaining the lead film in an ambient temperature below its critical transition temperature, said film extending beyond said pickup coil a sufficient distance to shield said pickup coil from lines of flux other than those penetrating through said film.

References Cited by the Examiner

UNITED STATES PATENTS 2,946,030   7/1960   Slade _____ 207—88

OTHER REFERENCES

"An Analysis of the Operation of a Persistent-Supercurrent Memory Cell" (Garwin), IBM Journal, October 1957, received June 1, 1957, pages 304–308.

"Trapped-Flux Superconducting Memory" (Growe), IBM Journal, October 1957, pre. Aug. 26, 1957, pp. 295–302.

"Superconductivity" (Hewlett), General Elec. Review, vol. 49, No. 6, June 1946, pages 19–25.

"Trapped Flux in Superconductors" (Pippard), The Royal Society Mond. Lab., Cambridge—Philosophical Transactions Series A, vol. 248, A.941, June 23, 1955, pp. 97–129.

"The Persistatron: A Superconducting Memory and Switching Element for Computers" (Buckingham), Low Temperature Physics and Chemistry, Oct. 24, 1958, conference held August 26–31, 1957, pp. 229–232.

"Trapped Flux Superconducting Memory" (Crowe), Low Temperature Physics and Chemistry, Proceedings of the Fifth International Conference on Low Temperature Physics and Chemistry (Oct. 24, 1958, conference held Aug. 26–31, 1957, pp. 238–241.

BERNARD KONICK, *Primary Examiner.*

E. R. REYNOLDS, IRVING SRAGOW, *Examiners.*

J. P. VANDENBURG, T. W. FEARS, R. JENNINGS,
*Assistant Examiners.*